(12) United States Patent
Ogi (10) Patent No.: US 6,724,537 B2
(45) Date of Patent: Apr. 20, 2004

(54) LENS ARRAY FOR UNITY MAGNIFICATION IMAGING, AND IMAGE READING APPARATUS USING THE SAME ARRAY

(75) Inventor: Shuya Ogi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 7 days.

(21) Appl. No.: 10/268,512

(22) Filed: Oct. 10, 2002

(65) Prior Publication Data

US 2003/0095335 A1 May 22, 2003

(30) Foreign Application Priority Data

Oct. 10, 2001 (JP) ................................................ 313172

(51) Int. Cl.[7] .......................... G02B 27/10; G02B 3/00; G02B 6/04; G02B 6/02; G03B 27/00
(52) U.S. Cl. ....................... 359/619; 359/652; 359/654; 385/34; 385/120; 385/124; 355/1; 250/208.1
(58) Field of Search ................. 359/619, 620, 359/621, 652, 653, 654; 385/33, 34, 120, 124; 355/1; 250/208.1

(56) References Cited

U.S. PATENT DOCUMENTS

| | | | | | |
|---|---|---|---|---|---|
| 5,109,298 | A | * | 4/1992 | Nishi | 359/654 |
| 5,233,469 | A | * | 8/1993 | Araki | 359/652 |
| 5,450,157 | A | * | 9/1995 | Rees | 355/1 |
| 5,661,540 | A | * | 8/1997 | Kaihotsu et al. | 355/1 |
| 5,959,783 | A | * | 9/1999 | Kittaka et al. | 359/654 |
| 5,978,146 | A | * | 11/1999 | Kittaka et al. | 359/652 |
| 6,031,668 | A | * | 2/2000 | Toyama et al. | 359/654 |
| 6,088,164 | A | * | 7/2000 | Fukasawa | 359/619 |
| 6,429,977 | B2 | * | 8/2002 | Kittaka | 359/654 |
| 6,449,414 | B1 | * | 9/2002 | Tahara et al. | 385/120 |
| 6,545,811 | B1 | * | 4/2003 | Fujimoto | 359/619 |
| 6,563,647 | B2 | * | 5/2003 | Fukuzawa | 359/620 |
| 6,597,512 | B2 | * | 7/2003 | Toyama | 359/654 |

* cited by examiner

Primary Examiner—Loha Ben
(74) Attorney, Agent, or Firm—Fish & Richardson P.C.

(57) ABSTRACT

A miniaturized lens array for unity magnification imaging comprises a plurality of rod lenses arranged in one row. An arrangement pitch D of the rod lenses is defined to satisfy $(2m+1)\cdot D \leq 2.1$ mm or 2.5 mm. An angle of aperture $\theta$ of the rod lens is defined to satisfy $\alpha D/6 \times \{n \cdot \cos^{-1}(-\alpha/2/m) + (4m^2/\alpha^2 - 1)^{1/2}\} \leq \theta \leq \alpha D/2 \times (4/m^2/\alpha^2 - 1)^{1/2}$. The arrangement pitch D and angle of aperture $\theta$ are defined in this manner, and it is therefore possible to obtain the lens array whose difference between a total width and effective lens width is equal to or smaller than 2.1 mm or 2.5 mm.

14 Claims, 3 Drawing Sheets

Light Amount Distribution

LENS ARRAY FOR UNITY MAGNIFICATION IMAGING, AND IMAGE READING APPARATUS USING THE SAME ARRAY

CROSS REFERENCE TO RELATED APPLICATIONS

Pursuant to 35 USC §119, this application claims the benefit of Japan Patent Application No. 2001-313172, filed Oct. 10, 2001.

BACKGROUND OF THE INVENTION

The present invention relates to a lens array for unity magnification imaging, particularly to a lens array for unity magnification imaging used preferably in an image reading apparatus mounted on portable electronic apparatuses such as a cellular phone.

In apparatuses such as a facsimile apparatus, copying machine, and scanner, image reading apparatuses such as a contact type image sensor for reading an image on an original copy have heretofore been used. The contact type image sensor has broadly been used because the sensor can be miniaturized.

Figure 1:
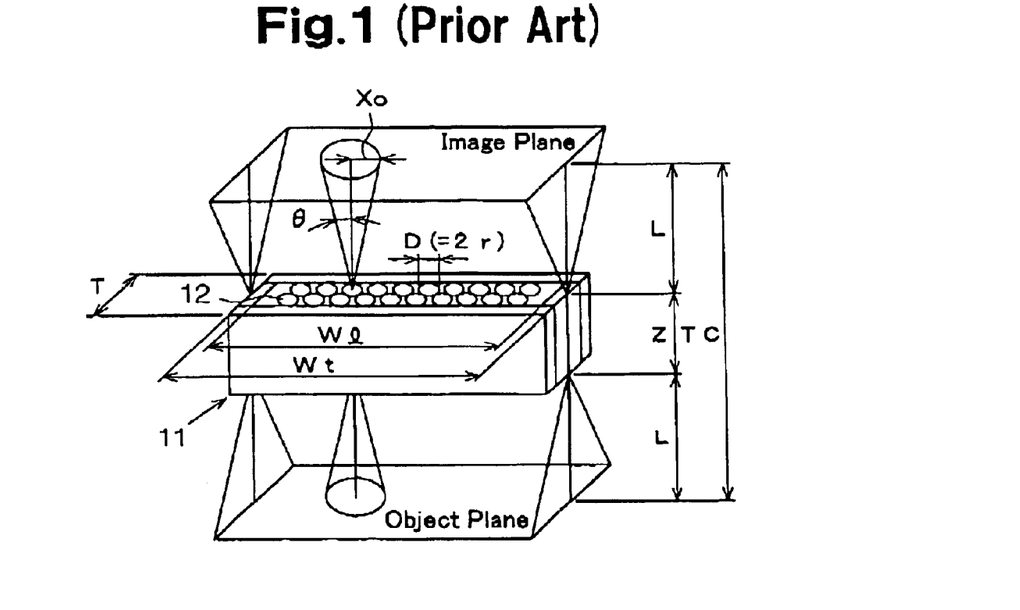
FIG. 1 is a schematic view of a conventional rod lens array.

The contact type image sensor includes: a light source such as an LED array for irradiating the original copy with an illuminating light; a lens array for forming light reflected from the original copy into an image; and a photoconductive device disposed in an image formation point. As shown in FIG. 1, a conventional lens array for unity magnification imaging array 11 of the contact type image sensor forms the image on the original copy as an erected image having a unity magnification on the photoconductive device. The lens array 11 has, for example, a conjugate length TC of about 10 mm, and includes a plurality of rod lenses 12 arranged in two rows.

However, when the contact type image sensor including the conventional lens array 11 is mounted on portable electronic apparatuses such as a cellular phone and personal computer, there has been a problem of increase of a size of the apparatus. Reasons for this are as follows.

Figure 2:
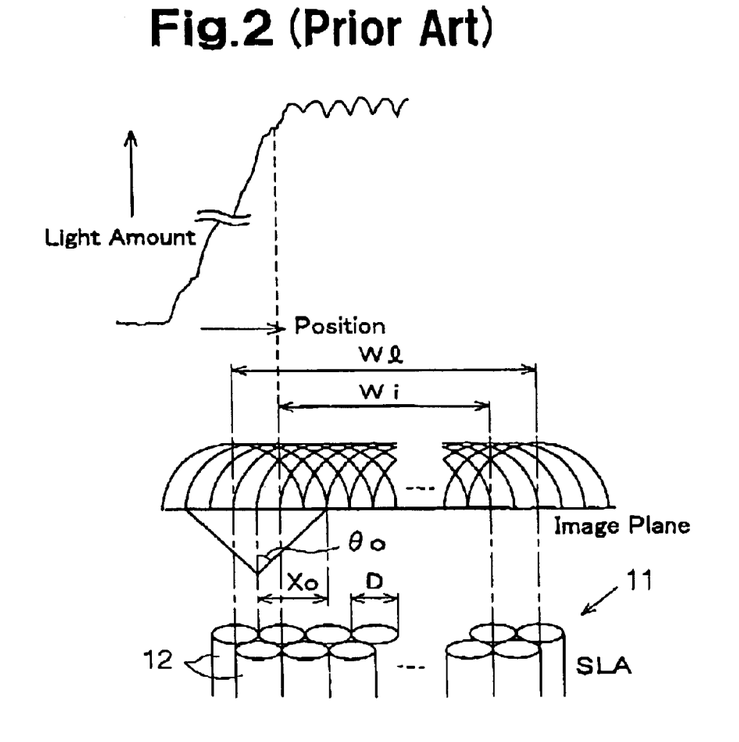
FIG. 2 is an explanatory view of an image reading effective range of the rod lens array of FIG. 1.

(1) An effective image reading width Wi (see FIG. 2) of the rod lens array 11 is smaller than a total width Wt (see FIG. 1) of the rod lens array 11 by 5 to 6 mm. Therefore, it is necessary to secure a space broader than the width essentially necessary for the reading in the apparatus. Here, the effective image reading width Wi in a range in which a constant light amount is obtained (a range from which periodic light amount unevenness is removed). Moreover, Wl in FIGS. 1 and 2 is an effective lens width.

(2) The conjugate length TC of about 10 mm is relatively long, and it is therefore difficult to contain the contact type image sensor including the rod lens array 11 in the portable electronic apparatus which has the existing thickness.

SUMMARY OF THE INVENTION

An object of the present invention is to provide a miniaturized lens array.

In a first embodiment of the present invention, a lens array for unity magnification imaging is provided that includes a plurality of rod lenses arranged in at least one row at a lens arrangement pitch D. Each rod lens has an angle of aperture $\theta$. The lens arrangement pitch D is defined to satisfy the following equation (1):

$$(2m+1) \cdot D \leq 2.1 \text{ mm} \tag{1},$$

wherein m is an overlap degree of the plurality of rod lenses. The angle of aperture $\theta$ of the rod lens is defined to satisfy the following equation (2):

$$\alpha D/6 \times \{n \cdot \cos^{-1}(-\alpha/2/m)+(4m^2/\alpha^2-1)^{1/2}\} \leq \theta \leq \alpha D/2 \times (4m^2/\alpha^2-1)^{1/2} \tag{2},$$

wherein n is a refractive index on an optical axis of the rod lens, d is an effective diameter of the rod lens, $\alpha$ is a filling factor of the lens array. The overlap degree m is set in a range of 1.53 to 3.00 when the plurality of rod lenses are arranged in odd-numbered rows. The overlap degree is set in a range of 1.10 to 3.00 when the plurality of rod lenses are arranged in even-numbered rows.

In a second embodiment of the present invention, a lens array for unity magnification imaging is provided that includes a plurality of rod lenses arranged in at least one row at a lens arrangement pitch D. Each rod lens has an angle of aperture $\theta$. The lens arrangement pitch D is defined to satisfy the following equation (1):

$$(2m+1) \cdot D \leq 2.5 \text{ mm} \tag{1},$$

wherein m is an overlap degree of the plurality of rod lenses. The angle of aperture $\theta$ of the rod lens is defined to satisfy the following equation (2):

$$\alpha D/6 \times \{n \cdot \cos^{-1}(-\alpha/2/m)+(4m^2/\alpha^2-1)^{1/2}\} \leq \theta \leq \alpha D/2 \times (4m^2/\alpha^2-1)^{1/2} \tag{2},$$

wherein n is a refractive index on an optical axis of the rod lens, d is an effective diameter of the rod lens, $\alpha$ is a filling factor of the lens array. The overlap degree m is set in a range of 1.53 to 3.00 when the plurality of rod lenses are arranged in odd-numbered rows. The overlap degree is set in a range of 1.10 to 3.00 when the plurality of rod lenses are arranged in even-numbered rows.

In a third embodiment of the present invention, an image reading apparatus is provided that includes a light source for irradiating an original copy with illuminating light, a lens array for unity magnification imaging, for forming the light reflected by the original copy into an image, and a photoelectric conversion unit disposed in an image formation point of the lens array. The lens array for unity magnification imaging includes a plurality of rod lenses arranged in at least one row at a lens arrangement pitch D. Each rod lens has an angle of aperture $\theta$. The lens arrangement pitch D is defined to satisfy the following equation (1):

$$(2m+1) \cdot D \leq 2.1 \text{ mm} \tag{1},$$

wherein m is an overlap degree of the plurality of rod lenses. The angle of aperture $\theta$ of the rod lens is defined to satisfy the following equation (2):

$$\alpha D/6 \times \{n \cdot \cos^{-1}(-\alpha/2/m)+(4m^2/\alpha^2-1)^{1/2}\} \leq \theta 23 \, \alpha D/2 \times (4m^2/\alpha^2-1)^{1/2} \tag{2},$$

wherein n is a refractive index on an optical axis of the rod lens, d is an effective diameter of the rod lens, $\alpha$ is a filling factor of the lens array. The overlap degree m is set in a range of 1.53 to 3.00 when the plurality of rod lenses are arranged in odd-numbered rows. The overlap degree is set in a range of 1.10 to 3.00 when the plurality of rod lenses are arranged in even-numbered rows.

In a fourth embodiment of the present invention, an image reading apparatus is provided that includes a light source for irradiating an original copy with illuminating light, d lens array for unity magnification imaging, for forming the light reflected by the original copy into an image, and a photoelectric conversion unit disposed in an image formation point of the lens array. The lens array for unity magnification imaging includes a plurality of rod lenses arranged in at least one row at a lens arrangement pitch D. Each rod lens has an angle of aperture θ. The lens arrangement pitch D is defined to satisfy the following equation (1):

$$(2\ m+1) \cdot D \leq 2.5\ \text{mm} \quad (1),$$

wherein m is an overlap degree of the plurality of rod lenses. The angle of aperture θ of the rod lens is defined to satisfy the following equation (2):

$$\alpha D/6 \times \{n \cdot \cos^{-1}(-\alpha/2/m) + (4\ m^2/\alpha^2 - 1)^{1/2}\} \leq \theta 23\ \alpha D/2 \times (4\ m^2/\alpha^2 - 1)^{1/2} \quad (2),$$

wherein n is a refractive index on an optical axis of the rod lens, d is an effective diameter of the rod lens, α is a filling factor of the lens array. The overlap degree m is set in a range of 1.53 to 3.00 when the plurality of rod lenses are arranged in odd-numbered rows. The overlap degree is set in a range of 1.10 to 3.00 when the plurality of rod lenses are arranged in even-numbered rows.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

A rod lens array 21 as lenses for unity magnification imaging according to a first embodiment of the present invention will be described hereinafter with reference to the drawings.

Figure 3:
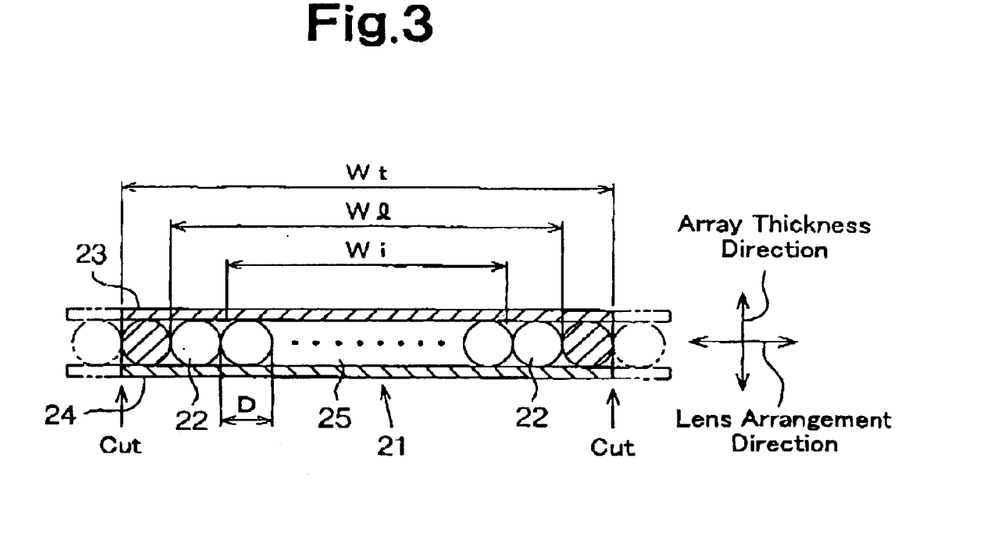
FIG. 3 is a sectional view of the rod lens array according to a first embodiment of the present invention.

As shown in FIG. 3, the rod lens array 21 includes: a plurality of rod lenses 22 arranged in one row so that light axes extend in parallel with one another; and side plates 23, 24 disposed on opposite sides of the rod lenses in order to fix the plurality of rod lenses 22. That is, the side plates 23, 24 are arranged on the opposite sides of the rod lenses 22 in a thickness direction of the rod lens array 21, and the rod lens array 21 is formed in a rectangular parallelepiped shape. Each rod lens 22 is a columnar lens for forming an erected image having a unity magnification. Moreover, each rod lens 22 is a refractive index distribution type rod lens which has a refractive index distribution in a radius direction. The plurality of rod lenses 22 are arranged in one row so that the images generated by the adjacent rod lenses 22 overlap with each other at the same overlap degree m. Moreover, the plurality of rod lenses 22 are integrally formed by a resin portion 25.

The resin portion 25 is formed of a black silicone resin or epoxy resin to remove a flare light. The resin portion 25 is formed integrally with the plurality of rod lenses 22 so that gaps among the respective rod lenses 22 and side plates 23, 24 are filled and the periphery of all the rod lenses 22 is coated. Moreover, the side plates 23, 24 are bonded to opposite side surfaces of the resin portion 25 in an array thickness direction. Each of the side plates 23, 24 is formed of a material which has substantially the same coefficient of thermal expansion as that of the rod lens 22. When the rod lens 22 is a glass lens, a glass-fabric backing epoxy rein black laminated plate (FRP) is preferably used in each of the side plates 23, 24.

The rod lens array 21 is formed to satisfy the following conditions (1) and (2), so that the contact type image sensor (image reading apparatus) including the rod lens array 21 is mounted in the portable electronic apparatus.

Condition (1): A difference (Wt–Wi) between a total width (maximum total width value) Wt and an effective image reading width Wi is equal to or smaller than 2.5 mm.

Condition (2): A conjugate length TC (see FIG. 1) is equal to or smaller than 6 mm. Additionally, an operation distance L (see FIG. 1) is equal to or grater than 1 mm.

Concretely, for the rod lens array 21 of the first embodiment, the overlap degree m and lens arrangement pitch D are defined according to the following equation (4) to satisfy the condition (1), and an angle of aperture θ of the rod lens array 21 is defined according to the following equation (11) to satisfy the condition (2). Moreover, the total width Wt is determined based on the lens arrangement pitch D which satisfies the following equation (4), and the opposite side portions of the side plates 23, 24 are cut (in portions shown by arrows of FIG. 3) in a lens arrangement direction so that the total width Wt is obtained.

The effective image reading width Wi of the rod lens array 21 is obtained from the following equation (1):

$$Wi = Wl - 2 \cdot (X_0 - D/2) = Wl - (2\ m-1) \cdot D \quad (1)$$

wherein Wl is an effective lens width of the rod lens array 21 (see FIGS. 1 and 3), $X_0$ is a view field radius (see FIG. 1), D is a lens arrangement pitch (see FIGS. 1, 2 and 3), and m is an overlap degree.

When the rod lens array 21 having a predetermined total width Wt is formed by the cutting, and two rod lenses existing in both the ends as shown by hatched lines in FIG. 3 are damaged and do not function, the difference between the effective lens width Wl and total width Wt is maximized. In this case, the following equation (2) is established.

$$Wt = Wl + 2D \quad (2)$$

The following equation (3) is obtained from the above equations (1) and (2).

$$Wi = Wt - (2m+1) \cdot D \quad (3)$$

A presumable cut precision is about ±0.2 mm. In consideration of this cut precision and the above condition (1) (Wt–Wi≦2.5 mm), the following equation (4) is obtained.

$$Wt - Wi = (2\ m+1) \cdot D \leq 2.5 - 2 \times 0.2 = 2.1\ (\text{mm}) \therefore (2\ m+1) \cdot D \leq 2.1 \quad (4)$$

In the first embodiment in which a plurality of rod lenses 22 are arranged in one row (odd-numbered rows), in consideration of a balance between periodic light amount unevenness and brightness, the value of the overlap degree m is substantially set in a range of 1.53 to 3.00. With the overlap degree of m−1.53, the lens arrangement pitch D≦0.517 mm is set. With the overlap degree of m=3.00, the lens arrangement pitch D≦0.3 mm is set.

Subsequently, to satisfy the condition (2) concerning the conjugate length TC (conjugate length TC≦6 mm), the range of the angle of aperture θ of the rod lens array 21 of the first embodiment is defined. It is to be noted that optical parameters for use in the following equations are as follows: n is a refractive index on an optical axis of the rod lens 22; √A is a refractive index distribution constant; P is one period length; 0 is the angle of aperture; r is an effective radius; and d is an effective diameter. Moreover, Z is a lens length of the rod lens array 21, L is an operation distance, TC is a conjugate length, D is a lens arrangement pitch (lens device arrangement period), and α (α=d/D) is a filling factor of the rod lens array 21.

The angle of aperture θ, operation distance L, and overlap degree m are represented by the following equations (5), (6), and (7), respectively.

$$0 = n \times \sqrt{A} \times r \quad (5)$$

$$L = -1/n \sqrt{A} \times \tan(Z\pi/P) \quad (6)$$

$$m = -\alpha/2/\cos(Z\pi/P) \quad (7)$$

The following equation is obtained from the above equations (6) and (7).

$$(n \cdot \sqrt{A} L)^2 + 1 = (2 \, m/\alpha)^2$$

When the equation (5) is assigned to the above equation, the following equation (8) is obtained.

$$L = r/\theta \times (4 \, m^2/\alpha^2 - 1)^{1/2} \quad (8)$$

Moreover, the following equation (9) is obtained from the above equation (7).

$$Z = P/\pi \times \cos^{-1}(-\alpha/2/m) = 2 \cdot n \cdot r/\theta \times \cos^{-1}(-\alpha/2/m) \quad (9)$$

Since TC=Z+2L (see FIG. 1), the following equation (10) is obtained from the above equations (8) and (9).

$$TC = \alpha D/0 \times \{n \cdot \cos^{-1}(-\alpha/2/m) + (4 \, m^2/\alpha^2 - 1)^{1/2}\} \quad (10)$$

Here, the above equations (8), (10) are assigned to 1≦L defined by the condition (2) and the conjugate length TC≦6 mm, respectively, and the following equation (11) for defining the angle of aperture θ is obtained.

$$\alpha/D/6 \times \{n \cdot \cos^{-1}(-\alpha/2/m) + (4 \, m^2/\alpha^2 - 1)^{1/2}\} \leq \theta \leq \alpha D/2 \times (4 \, m^2/\alpha^2 - 1)^{1/2} \quad (11)$$

The rod lens array 21 of the first embodiment has the following advantages.

(a) The overlap degree m and lens arrangement pitch D are defined according to the equation (4) so that the difference between the total width Wt and effective reading width Wi of the rod lens array 21 is equal to or smaller than 2.5 mm, and the total width Wt is determined based on the lens arrangement pitch D. Moreover, the opposite ends of the rod lens array 21 are cut in the lens arrangement direction so that the rod lens array 21 having the determined total width Wt is obtained. To determine the total width Wt, a maximum difference between the effective lens width Wl and total width Wt, and a cut error of the rod lens array 21 of +0.2 mm are considered. In other words, even when the difference between the effective lens width Wl and total width Wt is maximized, and the cut error of the rod lens array 21 is +0.2 mm, the rod lens array 21 having the difference of 2.5 mm or less between the effective reading width Wi and total width Wt can be realized. That is, it is possible to obtain the rod lens array 21 which is small in the total width Wt as compared with the conventional rod lens array.

Furthermore, the angle of aperture θ of the rod lens array 21 is defined according to the equation (11) so that the conjugate length TC is equal to or smaller than 6 mm. Since the conjugate length TC is equal to or smaller than 6 mm, the total width Wt is reduced, and additionally a thickness dimension of the rod lens array 21 is also reduced. The width and thickness of the rod lens array 21 are reduced in this manner, and the array is miniaturized. Therefore, for the image reading apparatus, it is unnecessary to secure a broad space for the rod lens array. Therefore, the image reading apparatus is miniaturized, and it is possible to contain the image reading apparatus in the portable electronic apparatus which has the existing thickness. In other words, the image reading apparatus using the rod lens array 21 of the first embodiment can be mounted on the portable electronic apparatus on which it has been impossible to mount the image reading apparatus using the conventional rod lens array.

(b) The angle of aperture θ of the rod lens array 21 is defined according to the equation (11) while the operation distance L equal to or greater than 1 mm is secured. Therefore, by the operation distance L, it is possible to secure a space for arranging other components in the vicinity of the rod lens array 21.

Figure 4:
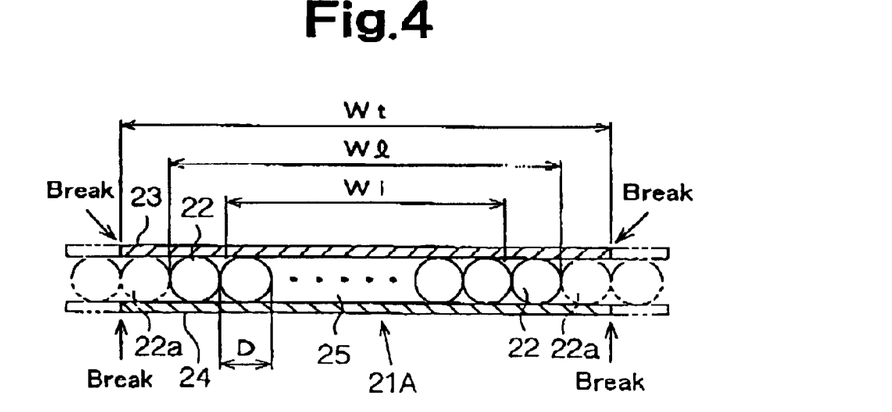
FIG. 4 is a sectional view of the rod lens array according to a second embodiment of the present invention.

As shown in FIG. 4, a rod lens array 21A according to a second embodiment of the present invention is designed to satisfy the above-described conditions (1) and (2). Concretely, the overlap degree m and lens arrangement pitch D are defined according to the following equation (4') in order to satisfy the condition (1), and the angle of aperture θ of the rod lens array 21 is defined according to the equation (11) in order to satisfy the condition (2). Furthermore, the opposite ends of each of the side plates 23, 24 of the rod lens array 21A are broken in the lens arrangement direction so that the total width Wt based on the lens arrangement pitch D defined according to the equation (4') is obtained.

When the rod lens array 21A having the predetermined total width is formed by breaking the ends, the difference between the effective lens width Wl and total width Wt is maximized in the following case. That is, opposite-ends rod lenses 22a, 22 shown by two-dots chain lines of FIG. 4 are omitted, and the opposite ends of the side plates 23, 24 and the opposite ends of the resin portion 25 remain in which the rod lenses 22a, 22 do not exist. In this case, a relationship among Wt, Wl and Wi is determined by the equations (2) and (3).

When the side plates 23, 24 are broken, the dimension precision is higher than the cut precision, and therefore does not have to be considered. Moreover, when the total width Wt is relatively small, the precision of the lens arrangement pitch D of the rod lens array 21A is smaller than the cut precision (about ±0.2 mm) by one digit. Therefore, the precision of the lens arrangement pitch D is negligible. Therefore, in the second embodiment, when the condition (1) ((Wt−Wi)≦2.5 mm) is assigned to the equation (3), the following equation (4') is obtained.

$$Wt - Wi = (2 \, m+1) \cdot D \leq 2.5 \, (\text{mm}) \therefore (2 \, m+1) \cdot D \leq 2.5 \quad (4')$$

It is to be noted that the value of the overlap degree m is set in a range of 1.53 to 3.00 similarly to the first embodiment.

The range of the angle of aperture θ of the rod lens array 21A is defined according to the equation (11).

The rod lens array 21A of the second embodiment has the following advantages.

(a) The opposite ends of the side plates 23, 24 are broken in the lens arrangement direction so that the rod lens array 21A having the total width Wt determined according to the equation (4') is obtained. Therefore, even when the difference between the effective lens width Wl and total width Wt is maximized, the difference between the effective reading width Wi and total width Wt is equal to or smaller than 2.5 mm. Therefore, the rod lens array 21A is miniaturized.

(b) The angle of aperture θ of the rod lens array 21 is defined according to the equation (11) while the operation distance L equal to or greater than 1 mm is secured. Therefore, by the operation distance L, the space for arranging the other components can be secured in the vicinity of the rod lens array 21A.

Figure 5:
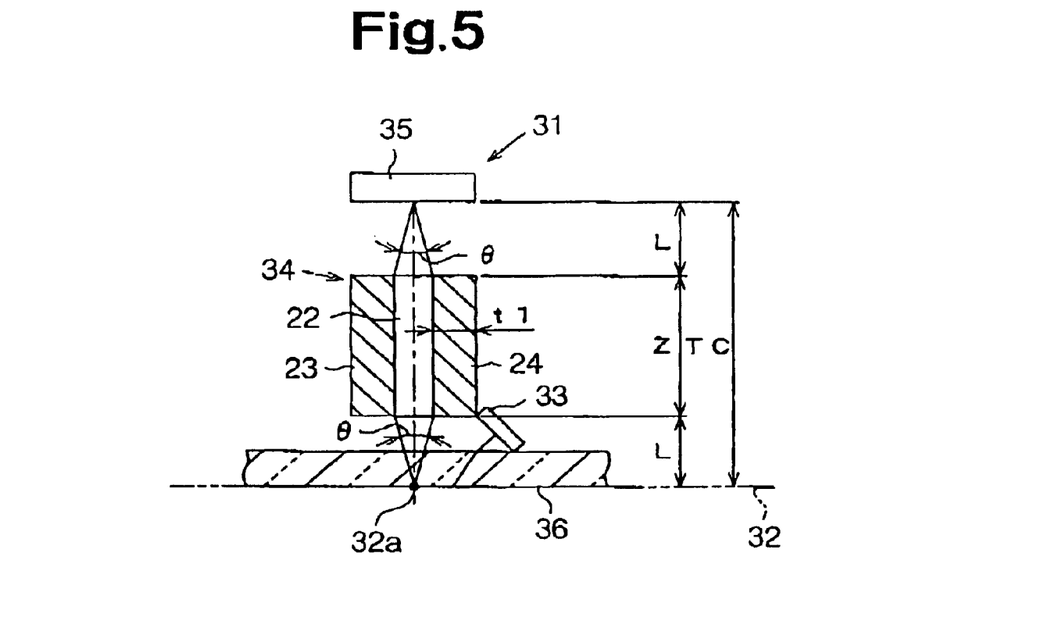
FIG. 5 is a schematic view of a contact type image sensor including the rod lens array of FIG. 3 according to a third embodiment of the present invention.

As shown in FIG. 5, a contact type image sensor 31 as the image reading apparatus according to a third embodiment of the present invention includes: an arrayed or linear light source 33 for irradiating a read portion 32a on an original copy 32 with an illuminating light; a lens array for unity magnification imaging 31; a photoconductive device array 35 as light source conversion means; and a cover glass 36. When the read portion 32a of the original copy 32 is irradiated with the illuminating light from the light source 33, the illuminating light is reflected by the original copy 32. The reflected light is formed into the image on the photoconductive device array 35 by the lens array for unity magnification imaging 34. That is, the image put in the original copy 32 is formed as the erected image having the unity magnification on the photoconductive device array 35 by the lens array for unity magnification imaging 34. The lens array for unity magnification imaging 34 corresponds to the rod lens array 21 shown in FIG. 3. in the arrayed light source 33, an LED array is used in which a plurality of LED devices are arranged in one row. A photoconductor including LED as the light source is used in the linear light source.

The contact type image sensor 31 of the third embodiment has the following advantages.

(a) The rod lens array 21 whose difference between the total width Wt and effective image reading width Wi is equal to or smaller than 2.5 mm is used as the lens array for unity magnification imaging 34. The rod lens array 21 having a small total width Wt is used. Therefore, the contact type image sensor 31 can be mounted on the portable electronic apparatus such as the cellular phone on which it has been impossible to mount the image reading apparatus using the conventional rod lens array.

(b) The rod lens array 21 having the conjugate length TC equal to or smaller than 6 mm and the operation distance L equal to or greater than 1 mm is used as the lens array for unity magnification imaging 34. Therefore, the thickness of the contact type image sensor 31 is reduced, and it is possible to contain the contact type image sensor 31 in the portable electronic apparatus which has the existing thickness. Therefore, the contact type image sensor 31 can be mounted on the portable electronic apparatus such as the cellular phone on which it has been impossible to mount the image reading apparatus using the conventional rod lens array.

(c) Since the operation distance L of the rod lens array 21 is equal to or greater than 1 mm, the space for arranging the other components can be secured in the vicinity of the rod lens array 21.

Figure 6:
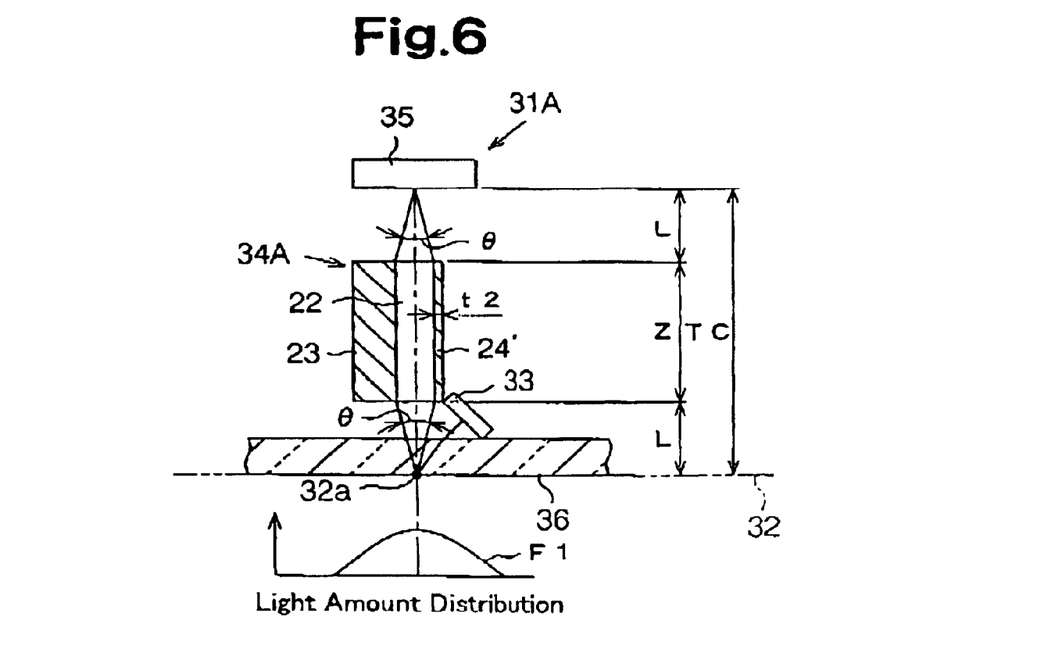
FIG. 6 is a schematic view of the contact type image sensor including the rod lens array of FIG. 4 according to a fourth embodiment of the present invention.

As shown in FIG. 6, a contact type image sensor 31A according to a fourth embodiment of the present invention includes a lens array for unity magnification imaging 34A in which the thickness of a side plate 24' on a light source 33 side is set at 0.4 mm or less.

The contact type image sensor 31A of the fourth embodiment has the following advantages.

Since the thickness of the side plate 24' of the rod lens array 21 is equal to or smaller than 0.4 mm, a part of the illuminating light is not interrupted by the side plate 24', and a center of a light amount distribution Fl of the illuminating light substantially agrees with the read portion 32a of the original copy 32. As a result, illuminating efficiency by the light source 33 is enhanced.

It should be apparent to those skilled in the art that the present invention may be embodied in many other specific forms without departing from the spirit or scope of the invention. Particularly, it should be understood that the invention may be embodied in the following forms.

A plurality of rod lenses 22 may be arranged not only in one row but also in two or more rows.

Even when the plurality of rod lenses 22 are arranged in the odd-numbered rows other than one row, the range of 1.53 to 3.00 of the value of the overlap degree m is applied. When the plurality of rod lenses 22 are arranged in even-numbered rows, in consideration of the balance between the periodic light amount unevenness and brightness, the overlap degree m is set substantially in a range of 1.10 to 3.00.

The present invention may also be applied to a rod lens array in which the side plate is attached only to one side surface of the resin portion 25, or a rod lens array in which no side plate is disposed. In the rod lens array including no side plate, the plurality of rod lenses are fixed by a resin. The rod lens array including no side plate is easily bent. However, when the rod lens array is directly attached to a support member of the apparatus, rigidity of the rod lens array can be secured. This rod lens array including no side plate is especially effective for the portable electronic apparatus which is strongly requested to be miniaturized in an advantage that the space of the side plate can be saved.

Only one end of the rod lens array 21 may also be cut in the lens array arrangement direction.

Only one end of the rod lens array 21 may also be broken in the lens arrangement direction.

The set value of the condition (1) is not limited to 2.5 mm. The numeric value can appropriately be changed in accordance with the size of the portable electronic apparatus. Therefore, a numeric value of 2.1 mm in the equation (4) may also appropriately be changed.

The set value of the condition (2) is not limited to 6 mm or 1 mm. That is, the conjugate length TC larger than 6 mm can appropriately be selected in accordance with the thickness of the portable electronic apparatus. Moreover, when the arrangement space for another component is not required, the operation distance L smaller than 1 mm can appropriately be selected.

In the contact type image sensor 31A, the side plate 24' of the rod lens array 21 may also be omitted.

The present invention is not limited to the image reading apparatus of the contact type image sensor mounted on the portable electronic apparatus. That is, the present invention can also be applied to apparatuses such as a facsimile apparatus, copying machine, and stationary scanner.

Therefore, the present examples and embodiments are to be considered as illustrative and not restrictive and the invention is not to be limited to the details given herein, but may be modified within the scope and equivalence of the appended claims.

What is claimed is:

1. A lens array for unity magnification imaging, comprising:

a plurality of rod lenses arranged in at least one row at a lens arrangement pitch D, each rod lens having an angle of aperture θ, the lens arrangement pitch D being defined to satisfy the following equation (1):

$$(2m+1) \cdot D \leq 2.1 \text{ mm} \quad (1),$$

wherein m is an overlap degree of the plurality of rod lenses, the angle of aperture θ of the rod lens being defined to satisfy the following equation (2):

$$\alpha D/6 \times \{n \cdot \cos^{-1}(-\alpha/2/m) + (4m^2/\alpha^2-1)^{1/2}\} \leq \theta \leq \alpha D/2 \times (4m^2/\alpha^2-1)^{1/2} \quad (2),$$

wherein n is a refractive index on an optical axis of the rod lens, d is an effective diameter of the rod lens, α is a filling factor of the lens array, the overlap degree m is set in a range of 1.53 to 3.00 when the plurality of rod lenses are arranged in odd-numbered rows, and the overlap degree is set in a range of 1.10 to 3.00 when the plurality of rod lenses are arranged in even-numbered rows.

2. The lens array according to claim 1, wherein the lens array has a total width and effective reading width, the equation (1) indicates a condition of a difference between the total width and effective reading width, and the equation (1) is set considering that opposite ends of the lens array are cut to form the lens array.

3. The lens array according to claim 2, wherein the lens array has an effective lens width which is smaller than the total width and larger than the effective reading width, and the equation (1) is set in consideration of a maximum difference between the effective lens width and total width.

4. The lens array according to claim 1, wherein the lens array has a conjugate length, and the equation (2) is set on a condition that the conjugate length is equal to or smaller than 6 mm.

5. The lens array according to claim 4, wherein the lens array has an operation distance, and the equation (2) is set on a condition that the operation distance is equal to or greater than 1 mm.

6. A lens array for unity magnification imaging, comprising:

a plurality of rod lenses arranged in at least one row at a lens arrangement pitch D, each rod lens having an angle of aperture θ, the lens arrangement pitch D being defined to satisfy the following equation (1):

$$(2m+1) \cdot D \leq 2.5 \text{ mm} \quad (1),$$

wherein m is an overlap degree of the plurality of rod lenses, the angle of aperture θ of the rod lens being defined to satisfy the following equation (2):

$$\alpha D/6 \times \{n \cdot \cos^{-1}(-\alpha/2/m) + (4m^2/\alpha^2-1)^{1/2}\} \leq \theta \leq \alpha D/2 \times (4m^2/\alpha^2-1)^{1/2} \quad (2),$$

wherein n is a refractive index on an optical axis of the rod lens, d is an effective diameter of the rod lens, α is a filling factor of the lens array, the overlap degree m is set in a range of 1.53 to 3.00 when the plurality of rod lenses are arranged in odd-numbered rows, and the overlap degree is set in a range of 1.10 to 3.00 when the plurality of rod lenses are arranged in even-numbered rows.

7. The lens array according to claim 6, wherein the lens array has a total width and effective reading width, the equation (1) indicates a condition of a difference between the total width and effective reading width, and the equation (1) is set considering that at least one of opposite ends of the lens array are broken to form the lens array.

8. The lens array according to claim 7, wherein the lens array has an effective lens width which is smaller than the total width and larger than the effective reading width, and the equation (1) is set in consideration of a maximum difference between the effective lens width and total width.

9. The lens array according to claim 6, wherein the lens array has a conjugate length, and the equation (2) is set on a condition that the conjugate length is equal to or smaller than 6 mm.

10. The lens array according to claim 9, wherein the lens array has an operation distance, and the equation (2) is set on a condition that the operation distance is equal to or greater than 1 mm.

11. An image reading apparatus comprising:

a light source for irradiating an original copy with illuminating light;

a lens array for unity magnification imaging, for forming the light reflected by the original copy into an image; and a photoelectric conversion unit disposed in an image formation point of the lens array, the lens array for unity magnification imaging including:

a plurality of rod lenses arranged in at least one row at a lens arrangement pitch D, each rod lens having an angle of aperture θ, the lens arrangement pitch D being defined to satisfy the following equation (1):

$$(2m+1) \cdot D \leq 2.1 \text{ mm} \quad (1),$$

wherein m is an overlap degree of the plurality of rod lenses, the angle of aperture θ of the rod lens being defined to satisfy the following equation (2):

$$\alpha D/6 \times \{n \cdot \cos^{-1}(-\alpha/2/m) + (4m^2/\alpha^2-1)^{1/2}\} \leq \theta \leq \alpha D/2 \times (4m^2/\alpha^2-1)^{1/2} \quad (2),$$

wherein n is a refractive index on an optical axis of the rod lens, d is an effective diameter of the rod lens, α is a filling factor of the lens array, the overlap degree m is set in a range of 1.53 to 3.00 when the plurality of rod lenses are arranged in odd-numbered rows, and the overlap degree is set in a range of 1.10 to 3.00 when the plurality of rod lenses are arranged in even-numbered rows.

12. A portable electric apparatus comprising the image reading apparatus according to claim 11.

13. An image reading apparatus comprising:

a light source for irradiating an original copy with illuminating light;

a lens array for unity magnification imaging, for forming the light reflected by the original copy into an image; and a photoelectric conversion unit disposed in an image formation point of the lens array, the lens array for unity magnification imaging including:

a plurality of rod lenses arranged in at least one row at a lens arrangement pitch D, each rod lens having an angle of aperture θ, the lens arrangement pitch D being defined to satisfy the following equation (1):

$$(2m+1) \cdot D \leq 2.5 \text{ mm} \quad (1),$$

wherein m is an overlap degree of the plurality of rod lenses, the angle of aperture θ of the rod lens being defined to satisfy the following equation (2):

$$\alpha D/6 \times \{n \cdot \cos^{-1}(-\alpha/2m) + (4\ m^2/\alpha^2 - 1)^{1/2}\} \leq \theta \leq \alpha D/2 \times (4\ m^2/\alpha^2 - 1)^{1/2} \qquad (2),$$

wherein n is a refractive index on an optical axis of the rod lens, d is an effective diameter of the rod lens, α is a filling factor of the lens array, the overlap degree m is set in a range of 1.53 to 3.00 when the plurality of rod lenses are arranged in odd-numbered rows, and the overlap degree is set in a range of 1.10 to 3.00 when the plurality of rod lenses are arranged in even-numbered rows.

14. A portable electric apparatus comprising the image reading apparatus according to claim 13.

* * * * *

UNITED STATES PATENT AND TRADEMARK OFFICE
CERTIFICATE OF CORRECTION

PATENT NO. : 6,724,537 B2
DATED : April 20, 2004
INVENTOR(S) : Shuya Ogi

Page 1 of 1

It is certified that error appears in the above-identified patent and that said Letters Patent is hereby corrected as shown below:

<u>Title page,</u>
Item [30], Foreign Application Priority Data, replace "313172" with
-- 2001-313172 --.

Signed and Sealed this

Twenty-third Day of November, 2004

JON W. DUDAS
*Director of the United States Patent and Trademark Office*